W. T. Neil. Hay Elevator & Carrier.
116622
PATENTED JUL 4 1871
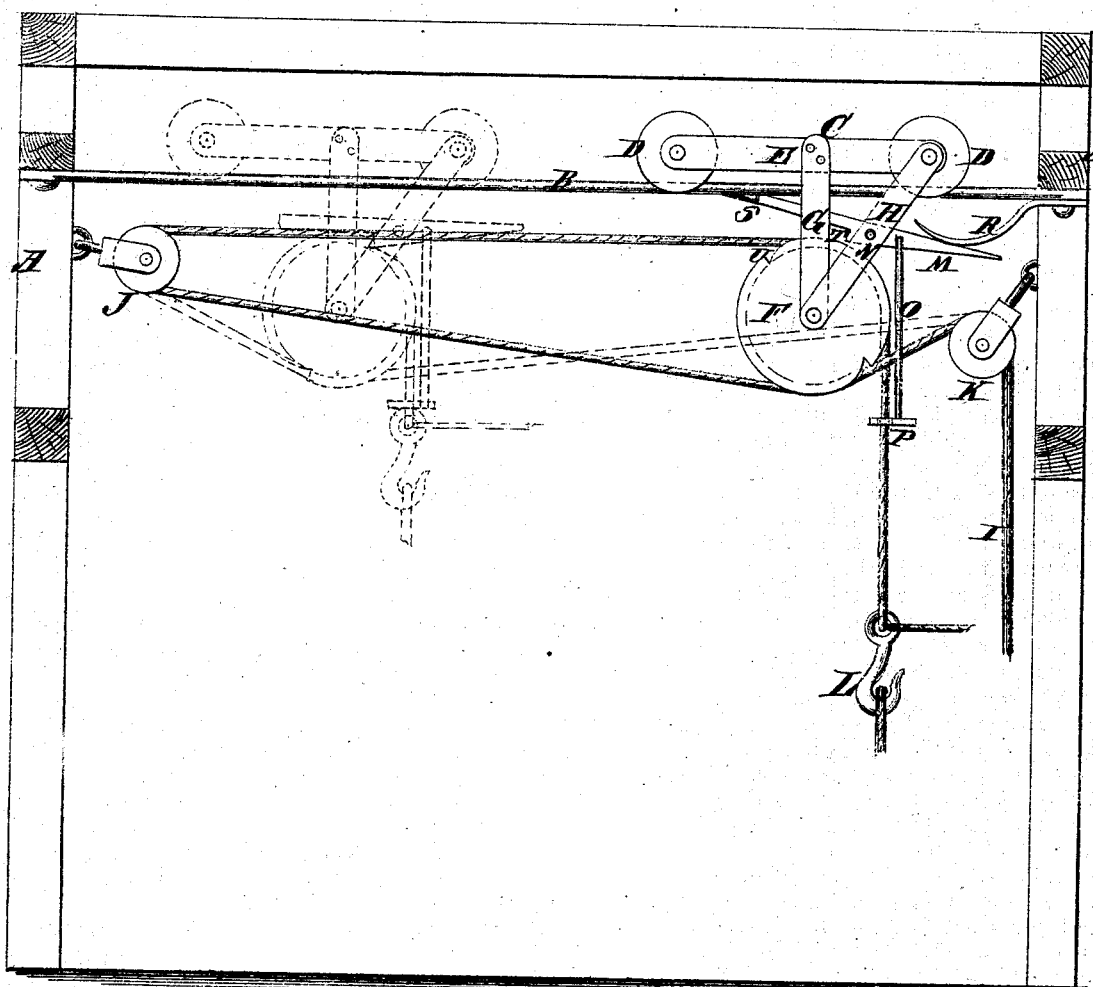

UNITED STATES PATENT OFFICE.

WILLIAM T. NEIL, OF GREENSBOROUGH, PENNSYLVANIA.

IMPROVEMENT IN HAY-ELEVATORS AND CARRIERS.

Specification forming part of Letters Patent No. 116,622, dated July 4, 1871.

*To all whom it may concern:*

Be it known that I, WILLIAM T. NEIL, of Greensborough, in the county of Greene and State of Pennsylvania, have invented a new and useful Improvement in Hay-Elevator and Carrier; and I do hereby declare that the following is a full, clear, and exact description thereof, which will enable others skilled in the art to make and use the same, reference being had to the accompanying drawing forming part of this specification.

This invention relates to improvement in hay-elevators and carriers; and consists in a certain arrangement of parts, one of the principal advantages of which is that part of the weight of the hay or other load is sustained by the cord which effects the propulsion of the same, thereby relieving the other parts correspondingly.

The accompanying drawing represents a side elevation of the apparatus as when connected with the timbers of the barn and ready for use.

A is the barn-frame. B is a horizontal rod rigidly attached to the timbers at each end. C is a car, consisting of the grooved wheels D D, which run or traverse back and forth on the rod B, and the connecting-plates E on the sides of the wheels, and the suspended grooved pulley F, the latter being supported from the plates E by the hanger G and brace H. I is the hoisting-rope. J and K are hanging pulleys over which the hoisting-rope works. L is the fork-hook. M is a dog which is pivoted to the brace H, as seen at N. O is a clevis attached to the dog M at one end and at the other end to the plate P, through which plate the hoisting-rope passes. R is a spring connected with the frame. As seen in the drawing, the end of the dog M is against the shoulder in the rod B, at S, and in this condition the car is locked for elevating the hay by drawing down on the rope I. It will be seen that the dog is held in this position by the spring R. As the hay is elevated the top of the fork L will strike the plate P, which will force the clevis O upward. This will disengage the end of the dog from the shoulder S, and the shoulder T of the dog will immediately engage with the notch *u* of the rope-pulley F, which will prevent the pulleys revolving. In this condition of things it will be seen that by a continued application of power to the rope I the car, with the hay that has been elevated, will be carried back as far as may be desired for dumping. When the hay has been discharged the car is brought back to the position seen in the drawing, where it has been automatically locked, ready for the operation of elevating to be repeated.

It will be seen that both the car and the car-pulley F are self-locking and unlocking, as each load is elevated, and that hay with this apparatus and the power hay-fork may be elevated and moved into the back portion of the barn and deposited with but little hand labor and in the most expeditious manner.

For elevating hay the rope I is carried down and under a snatch-pulley, a horse being attached to its end, as is usual in elevating with the power hay-fork.

Having thus described my invention, I claim as new and desire to secure by Letters Patent—

The arrangement of the rope I, pulleys J K, car C D E F G H, as shown and described, whereby part of the load suspended from the hook L is sustained by the cord I, as specified.

W. T. NEIL.

Witnesses:
J. L. PARCELS,
WM. LAMB.